(12) United States Patent
Karras et al.

(10) Patent No.: US 12,423,781 B2
(45) Date of Patent: Sep. 23, 2025

(54) TECHNIQUES FOR CONTENT SYNTHESIS USING DENOISING DIFFUSION MODELS

(71) Applicant: NVIDIA CORPORATION, Santa Clara, CA (US)

(72) Inventors: Tero Tapani Karras, Helsinki (FI); Miika Aittala, Helsinki (FI); Timo Oskari Aila, Tuusula (FI); Samuli Laine, Vantaa (FI)

(73) Assignee: NVIDIA CORPORATION, Santa Clara, CA (US)

( * ) Notice: Subject to any disclaimer, the term of this patent is extended or adjusted under 35 U.S.C. 154(b) by 382 days.

(21) Appl. No.: 18/182,271

(22) Filed: Mar. 10, 2023

(65) Prior Publication Data
US 2023/0368337 A1 Nov. 16, 2023

Related U.S. Application Data

(60) Provisional application No. 63/341,981, filed on May 13, 2022.

(51) Int. Cl.
*G06T 5/70* (2024.01)
*G06N 20/00* (2019.01)

(52) U.S. Cl.
CPC .............. *G06T 5/70* (2024.01); *G06N 20/00* (2019.01); *G06T 2207/20081* (2013.01); *G06T 2207/20084* (2013.01)

(58) Field of Classification Search
CPC ............ G06T 5/70; G06T 2207/20081; G06T 2207/20084; G06T 5/60; G06N 20/00; G06N 3/0464; G06N 3/0475; G06N 3/0495; G06N 3/084; G06N 3/094; G06N 3/044
See application file for complete search history.

(56) References Cited

U.S. PATENT DOCUMENTS

2022/0327662 A1* 10/2022 Matsuura .............. G06T 3/4046

OTHER PUBLICATIONS

Anderson, Brian D.O., "Reverse-Time Diffusion Equation Models", Stochastic Processes and their Applications, vol. 12, 1982, pp. 313-326.
Bao et al., "Analytic-DPM: An Analytic Estimate of the Optimal Reverse Variance in Diffusion Probabilistic Models", ICLR, arXiv:2201.06503, May 3, 2022, 39 pages.
Baranchuk et al., "Label-Efficient Semantic Segmentation with Diffusion Models", ICLR, arXiv:2112.03126, Mar. 16, 2022, 15 pages.
(Continued)

*Primary Examiner* — Christopher Wait
(74) *Attorney, Agent, or Firm* — Artegis Law Group, LLP

(57) ABSTRACT

Techniques are disclosed herein for generating a content item. The techniques include receiving a content item and metadata indicating a level of corruption associated with the content item; and for each iteration included in a plurality of iterations: performing one or more operations to add corruption to a first version of the content item to generate a second version of the content item, and performing one or more operations to reduce corruption in the second version of the content item to generate a third version of the content item, wherein a level of corruption associated with the third version of the content item is less than a level of corruption associated with the first version of the content item.

20 Claims, 10 Drawing Sheets

(56) References Cited

OTHER PUBLICATIONS

Choi et al., "Perception Prioritized Training of Diffusion Models", CVPR, 2022, 14 pages.
Choi et al., "StarGAN v2: Diverse Image Synthesis for Multiple Domains", arXiv:1912.01865, Apr. 26, 2020, 14 pages.
Deng et al., "ImageNet: A Large-Scale Hierarchical Image Database", CVPR, 2009, pp. 248-255.
Dhariwal et al., "Diffusion Models Beat GANs on Image Synthesis", arXiv:2105.05233, Jun. 1, 2021, 44 pages.
Dockhorn et al., "Score-Based Generative Modeling with Critically-Damped Langevin Diffusion", ICLR, arXiv:2112.07068, Mar. 25, 2022, 54 pages.
Dormand et al., "A Family of Embedded Runge-Kutta Formulae", Journal of Computational and Applied Mathematics, vol. 6, No. 1, 1980, pp. 19-26.
Goodfellow et al., "Generative Adversarial Nets", arXiv:1406.2661, Jun. 10, 2014, 9 pages.
Grenander et al., "Representations of Knowledge in Complex Systems", Journal of the Royal Statistical Society: Series B (Methodological), vol. 56, No. 4, 1994, pp. 549-603.
Heusel et al., "GANs Trained by a Two Time-Scale Update Rule Converge to a Local Nash Equilibrium", 31st Conference on Neural Information Processing Systems, arXiv:1706.08500, Nov. 8, 2017, 38 pages.
Ho et al., "Denoising Diffusion Probabilistic Models", 34th Conference on Neural Information Processing Systems, arXiv:2006.11239, Dec. 16, 2020, 25 pages.
Ho et al., "Cascaded Diffusion Models for High Fidelity Image Generation", Journal of Machine Learning Research, vol. 23, 2022, 33 pages.
Ho et al., "Classifier-Free Diffusion Guidance", NeurIPS 2021 Workshop on Deep Generative Models and Downstream Applications, 2021, 8 pages.
Ho et al., "Video Diffusion Models", arXiv:2204.03458, Jun. 22, 2022, 15 pages.
Huang et al., "A Variational Perspective on Diffusion-Based Generative Models and Score Matching", 35th Conference on Neural Information Processing Systems, arXiv:2106.02808, Sep. 30, 2021, 23 pages.
Huang et al., "Normalization Techniques in Training DNNs: Methodology, Analysis and Application", arXiv:2009.12836, Sep. 27, 2020, 20 pages.
Hyvarinen, Aapo, "Estimation of Non-Normalized Statistical Models by Score Matching", Journal of Machine Learning Research, vol. 6, 2005, pp. 695-708.
Jing et al., "Subspace Diffusion Generative Models", arXiv:2205.01490, May 3, 2022, 19 pages.
Jolicoeur-Martineau et al., "Gotta go Fast When Generating Data with Score-Based Models", arXiv:2105.14080, May 28, 2021, 24 pages.
Karras et al., "Training Generative Adversarial Networks with Limited Data", 34th Conference on Neural Information Processing Systems, arXiv:2006.06676, Oct. 7, 2020, 37 pages.
Karras et al., "Alias-Free Generative Adversarial Networks", 35th Conference on Neural Information Processing Systems, arXiv:2106.12423, Oct. 18, 2021, 31 pages.
Karras et al., "A Style-Based Generator Architecture for Generative Adversarial Networks", arXiv:1812.04948, Dec. 12, 2018, 12 pages.
Kong et al., "Diffwave: A Versatile Diffusion Model for Audio Synthesis", ICLR, arXiv:2009.09761, Mar. 30, 2021, 17 pages.
Krizhevsky, Alex, "Learning Multiple Layers of Features from Tiny Images", Apr. 8, 2009, 60 pages.
Lehtinen et al., "Noise2Noise: Learning Image Restoration without Clean Data", Proceedings of the 35th International Conference on Machine Learning, arXiv:1803.04189, Oct. 29, 2018, 12 pages.
Liu et al., "Pseudo Numerical Methods for Diffusion Models on Manifolds", ICLR, arXiv:2202.09778, Oct. 31, 2022, 24 pages.
Lu et al., "DPM-Solver: A Fast ODE Solver for Diffusion Probabilistic Model Sampling in Around 10 Steps", 36th Conference on Neural Information Processing Systems, arXiv:2206.00927, Oct. 13, 2022, 31 pages.
Luhman et al., "Knowledge Distillation in Iterative Generative Models for Improved Sampling Speed", arXiv:2101.02388, Jan. 7, 2021, 20 pages.
Mishkin et al., "DALL.E 2 preview—risks and limitations", OpenAI, 2022, 32 pages.
Nachmani et al., "Zero-Shot Translation using Diffusion Models", arXiv:2111.01471, Nov. 2, 2021, 4 pages.
Nichol et al., "Glide: Towards Photorealistic Image Generation and Editing with Text-Guided Diffusion Models", arXiv:2112.10741, Mar. 8, 2022, 20 pages.
Nichol et al., "Improved Denoising Diffusion Probabilistic Models", Proceedings of the 38th International Conference on Machine Learning, PMLR 139, 2021, 10 pages.
Popov et al., "Grad-TTS: A Diffusion Probabilistic Model for Text-to-Speech", Proceedings of the 38 th International Conference on Machine Learning, PMLR 139, 2021, arXiv:2105.06337, Aug. 5, 2021, 9 pages.
Preechakul et al., "Diffusion Autoencoders: Toward a Meaningful and Decodable Representation", arXiv:2111.15640, Mar. 10, 2022, 22 pages.
Ramesh et al., "Hierarchical Text-Conditional Image Generation with CLIP Latents", arXiv:2204.06125, Apr. 13, 2022, 27 pages.
Roberts, A. J., "Modify the Improved Euler Scheme to Integrate Stochastic Differential Equations", arXiv:1210.0933, Oct. 3, 2012, 26 pages.
Rombach et al., "High-Resolution Image Synthesis with Latent Diffusion Models", arXiv:2112.10752, Apr. 13, 2022, 45 pages.
Saharia et al., "Palette: Image-to-Image Diffusion Models", ACM SIGGRAPH, https://doi.org/10.1145/8888888.7777777, Aug. 8-11, 2022, 29 pages.
Salimans et al., "Progressive Distillation for Fast Sampling of Diffusion Models", ICLR, arXiv:2202.00512, Jun. 7, 2022, 21 pages.
Sauer et al., "StyleGAN-XL: Scaling StyleGAN to Large Diverse Datasets", SIGGRAPH '22 Conference Proceedings, https://doi.org/10.1145/3528233.3530738, Aug. 7-11, 2022, 19 pages.
Sohl-Dickstein et al., "Deep Unsupervised Learning using Nonequilibrium Thermodynamics", Proceedings of the 32nd International Conference on Machine Learning, vol. 37, 2015, 10 pages.
Song et al., "Denoising Diffusion Implicit Models", ICLR, arXiv:2010.02502, Nov. 4, 2021, 22 pages.
Song et al., "Generative Modeling by Estimating Gradients of the Data Distribution", 33rd Conference on Neural Information Processing Systems, arXiv:1907.05600, Oct. 29, 2019, 23 pages.
Song et al., "Score-Based Generative Modeling Through Stochastic Differential Equations", ICLR, arXiv:2011.13456, Feb. 10, 2021, 36 pages.
Szegedy et al., "Rethinking the Inception Architecture for Computer Vision", IEEE Conference on Computer Vision and Pattern Recognition, DOI 10.1109/CVPR.2016.308, 2016, pp. 2818-2826.
Tancik et al., "Fourier Features Let Networks Learn High Frequency Functions in Low Dimensional Domains", arXiv:2006.10739, Jun. 18, 2020, 24 pages.
Vahdat et al., "Score-based Generative Modeling in Latent Space", 35th Conference on Neural Information Processing Systems, arXiv:2106.05931, Dec. 2, 2021, 46 pages.
Vincent, Pascal, "A Connection Between Score Matching and Denoising Autoencoders", Neural Computation, vol. 23, 2011, pp. 1661-1674.
Watson et al., "Learning Fast Samplers for Diffusion Models by Differentiating Through Sample Quality", ICLR, arXiv:2202.05830, Feb. 11, 2022, 17 pages.
Watson et al., "Learning to Efficiently Sample from Diffusion Probabilistic Models", arXiv:2106.03802, Jun. 7, 2021, 13 pages.
Wolleb et al., "Diffusion Models for Implicit Image Segmentation Ensembles", Proceedings of Machine Learning Research, 2022, 13 pages.

(56) References Cited

OTHER PUBLICATIONS

Zhang et al., "Diffusion Normalizing Flow", 35th Conference on Neural Information Processing Systems, arXiv:2110.07579, Oct. 14, 2021, 25 pages.

Zhang et al., "Fast Sampling of Diffusion Models with Exponential Integrator", arXiv:2204.13902, Jun. 18, 2022, 26 pages.

* cited by examiner

TECHNIQUES FOR CONTENT SYNTHESIS USING DENOISING DIFFUSION MODELS

CROSS-REFERENCE TO RELATED APPLICATIONS

This application claims priority benefit of the United States Provisional Patent Application titled, "TECHNIQUES FOR IMPROVING DENOISING DIFFUSION MODELS," filed on May 13, 2022, and having Ser. No. 63/341,981. The subject matter of this related application is hereby incorporated herein by reference.

BACKGROUND

Technical Field

Embodiments of the present disclosure relate generally to artificial intelligence/machine learning and computer graphics and, more specifically, to techniques for content synthesis using denoising diffusion models.

Description of the Related Art

Generative models are computer models that can generate representations or abstractions of previously observed phenomena. Denoising diffusion models are one type of generative model. For example, some conventional denoising diffusion models take as input an image that includes random noise (e.g., a pure noise image, or a noisy version of an existing image) and generate an image that does not include noise.

One conventional approach for implementing a denoising diffusion model utilizes stochastic sampling. Returning to the example of generating an image, beginning from a noisy image, noise is added to the image in an iterative manner to generate a noisier image during conventional stochastic sampling. In parallel to adding noise to the image, noise is removed from that same image using a machine learning model to generate a clean image. Then, the noisier image and the clean image are combined into a single image via linear mixing. If the resulting single image includes noise, then the same steps of generating a noisier image in parallel with generating a clean image, as well as combining the noisier image and the clean image into a single image, are repeated for another iteration, until the resulting single image is an image that does not include noise.

One drawback of the above approach is that, oftentimes, a large number of iterations and a lengthy amount of time are required to generate a content item, such as an image, that does not include noise. Another drawback is that the machine learning model used to remove noise typically requires a large number of data samples to train. One approach for increasing the number of data samples used to train the machine learning model is to augment existing data samples, thereby creating additional data samples. Returning to the example of generating an image, the augmentations can include geometric transformations and/or color changes. However, training a conventional machine learning model using data samples that include such augmentations can cause the model to learn to generate content items that include similar augmentations, which is generally undesirable.

As the foregoing illustrates, what is needed in the art are more effective techniques for generating content items using denoising diffusion models.

SUMMARY

One embodiment of the present disclosure sets forth a computer-implemented method for generating a content item. The method includes receiving a content item and metadata indicating a level of corruption associated with the content item. The method further includes, for each iteration included in a plurality of iterations: performing one or more operations to add corruption to a first version of the content item to generate a second version of the content item, and performing one or more operations to reduce corruption in the second version of the content item to generate a third version of the content item, wherein a level of corruption associated with the third version of the content item is less than a level of corruption associated with the first version of the content item.

Another embodiment of the present disclosure sets forth a computer-implemented method for training a machine learning model. The method includes receiving training data that includes one or more samples. The method further includes generating one or more augmented samples based on the one or more samples and one or more augmentation parameters. In addition, the method includes performing one or more operations to train the machine learning model based on the one or more augmented samples and the one or more augmentation parameters to yield a trained machine learning model.

Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed techniques relative to the prior art is that the disclosed techniques can generate content items more quickly than what can be achieved using conventional denoising diffusion techniques. Further, relative to the content items that can be generated using conventional denoising diffusion techniques, content items generated using the disclosed techniques generally have better quality and are more diverse in terms of what is included in the content items. In addition, the disclosed techniques permit training data to be augmented in order to more effectively and accurately train machine learning models, such as machine learning models that remove corruption from content items, without negatively impacting outputs of the trained machine learning models. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
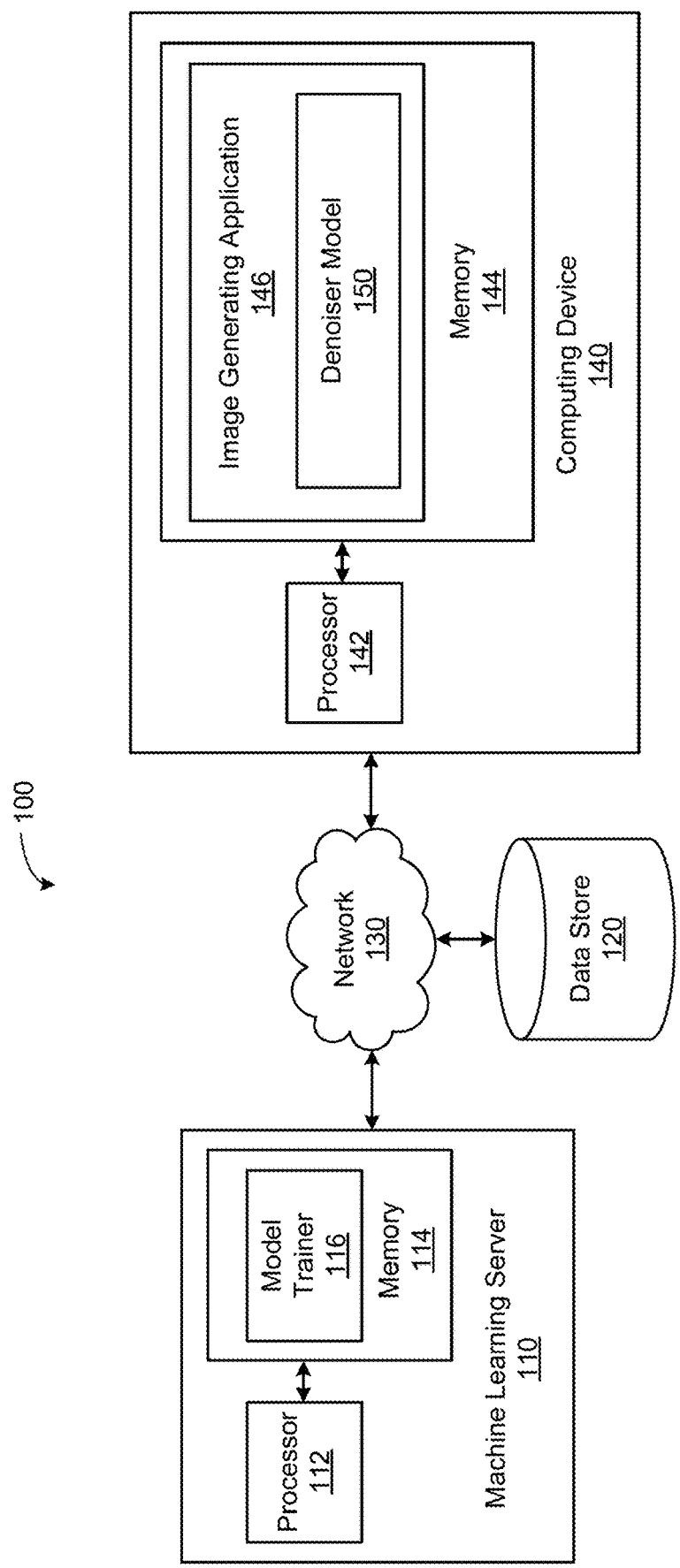
FIG. 1 is a block diagram illustrating a computer system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

General Overview

Embodiments of the present disclosure provide techniques for generating content items using denoising diffusion models. Although images are discussed herein as a reference example of content items, in some embodiments, techniques disclosed herein can be applied to generate content items that include any technically feasible data that can be corrupted to various degrees, such as bitmap images, video clips, audio clips, three-dimensional (3D) models, time series data, latent representations, etc. In some embodiments, an image generating application receives as input an image that includes noise and metadata indicating a level of noise in the image. For example, the image could include pure noise, or the image could be a noisy version of an existing image that is to be edited and/or modified. Although discussed herein primarily with respect to noise (e.g., uncorrelated Gaussian noise) as a reference example of corruption in images, in some embodiments, images can include any technically feasible corruption, such as noise, blur, filtering, masking, pixelation, dimensionality reduction, compression, quantization, spatial decimation, and/or temporal decimation. Given a noisy image as input, the image generating application generates an image that does not include noise by, for each of a number of time steps: (1) adding noise to a first version of the noisy image to generate a second version of the noisy image; and then (2) reducing noise in the second version of the noisy image to a level of noise below a level of noise associated with the first version of the image. In some embodiments, a trained denoiser machine learning model ("denoiser model") is applied to reduce the noise in the second version of the image. Further, the image generating application updates the metadata to indicate the levels of noise in the second version of the noisy image after the addition of noise and in the third version of the noisy image after the reduction of noise.

In addition, in some embodiments, augmented training data samples are generated based on augmentation parameters. In such cases, the denoiser model is trained using the augmented training data samples, and the augmentation parameters are input into the denoiser model as conditioning information during the training.

The techniques disclosed herein for generating content items, such as images, using denoising diffusion models have many real-world applications. For example, those techniques could be used to generate content items for a video game. As another example, those techniques could be used for generating stock photos based on a text prompt, image editing, image inpainting, image outpainting, colorization, compositing, superresolution, image enhancement/restoration, audio enhancement, generating 3D models, and/or production-quality rendering of films.

The above examples are not in any way intended to be limiting. As persons skilled in the art will appreciate, as a general matter, the techniques for generating content items using denoising diffusion models can be implemented in any suitable application.

System Overview

FIG. 1 illustrates a system 100 configured to implement one or more aspects of the various embodiments. As shown, the system 100 includes a machine learning server 110, a data store 120, and a computing device 140 in communication over a network 130, which can be a wide area network (WAN) such as the Internet, a local area network (LAN), or any other suitable network.

As shown, a model trainer 116 executes on a processor 112 of the machine learning server 110 and is stored in a system memory 114 of the machine learning server 110. The processor 112 receives user input from input devices, such as a keyboard or a mouse. In operation, the processor 112 is the master processor of the machine learning server 110, controlling and coordinating operations of other system components. In particular, the processor 112 can issue commands that control the operation of a graphics processing unit (GPU) (not shown) that incorporates circuitry optimized for graphics and video processing, including, for example, video output circuitry. The GPU can deliver pixels to a display device that can be any conventional cathode ray tube, liquid crystal display, light-emitting diode display, or the like.

The system memory 114 of the machine learning server 110 stores content, such as software applications and data, for use by the processor 112 and the GPU. The system memory 114 can be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) can supplement or replace the system memory 114. The storage can include any number and type of external memories that are accessible to the processor 112 and/or the GPU. For example, and without limitation, the storage can include a Secure Digital Card, an external Flash memory, a portable compact disc read-only memory (CD-ROM), an optical storage device, a magnetic storage device, or any suitable combination of the foregoing.

It will be appreciated that the machine learning server 110 shown herein is illustrative and that variations and modifications are possible. For example, the number of processors 112, the number of GPUs, the number of system memories 114, and the number of applications included in the system memory 114 can be modified as desired. Further, the connection topology between the various units in FIG. 1 can be modified as desired. In some embodiments, any combination of the processor 112, the system memory 114, and a GPU can be replaced with any type of virtual computing system, distributed computing system, or cloud computing environment, such as a public, private, or a hybrid cloud.

In some embodiments, the model trainer 116 is configured to train one or more machine learning models, including a denoiser model 150. The denoiser model 150 takes as inputs a noisy image and a level of noise in the noisy image. In some embodiments, the denoiser can additionally take application-specific conditioning inputs, such as a text prompt, another image, an embedding, a sentiment, or the like. Given the inputs, the denoiser model 150 outputs a clean image that does not include noise. In some embodiments, the denoiser model 150 can instead output an estimate of the noise in the input image, a mixture of the noise and a clean image, a latent representation, or a score vector. In some embodiments, the denoiser model 150 is an artificial neural network, such as a neural network having a U-Net architecture, transformer architecture, vision transformer architecture, recurrent interface network architecture, or convolutional architecture. Techniques for generating training data and training the denoiser model 150 using the training data are discussed in greater detail below in conjunction with FIGS. 8, 9A-9C, and 10. Training data and/or trained machine learning models can be stored in the data store 120. In some embodiments, the data store 120 can include any storage device or devices, such as fixed disc drive(s), flash drive(s), optical storage, network attached storage (NAS), and/or a storage area-network (SAN). Although shown as accessible over the network 130, in some embodiments the machine learning server 110 can include the data store 120.

As shown, an image generating application 146 is stored in a memory 144, and executes on a processor 142, of the computing device 140. The image generating application 146 uses the denoiser model 150 to perform a denoising diffusion technique, discussed in greater detail below in conjunction with FIGS. 3-7, that generates images from noisy images. In some embodiments, machine learning models, such as the denoiser model 150, that are trained according to techniques disclosed herein can be deployed to any suitable applications, such as the image generating application 146.

Figure 2:
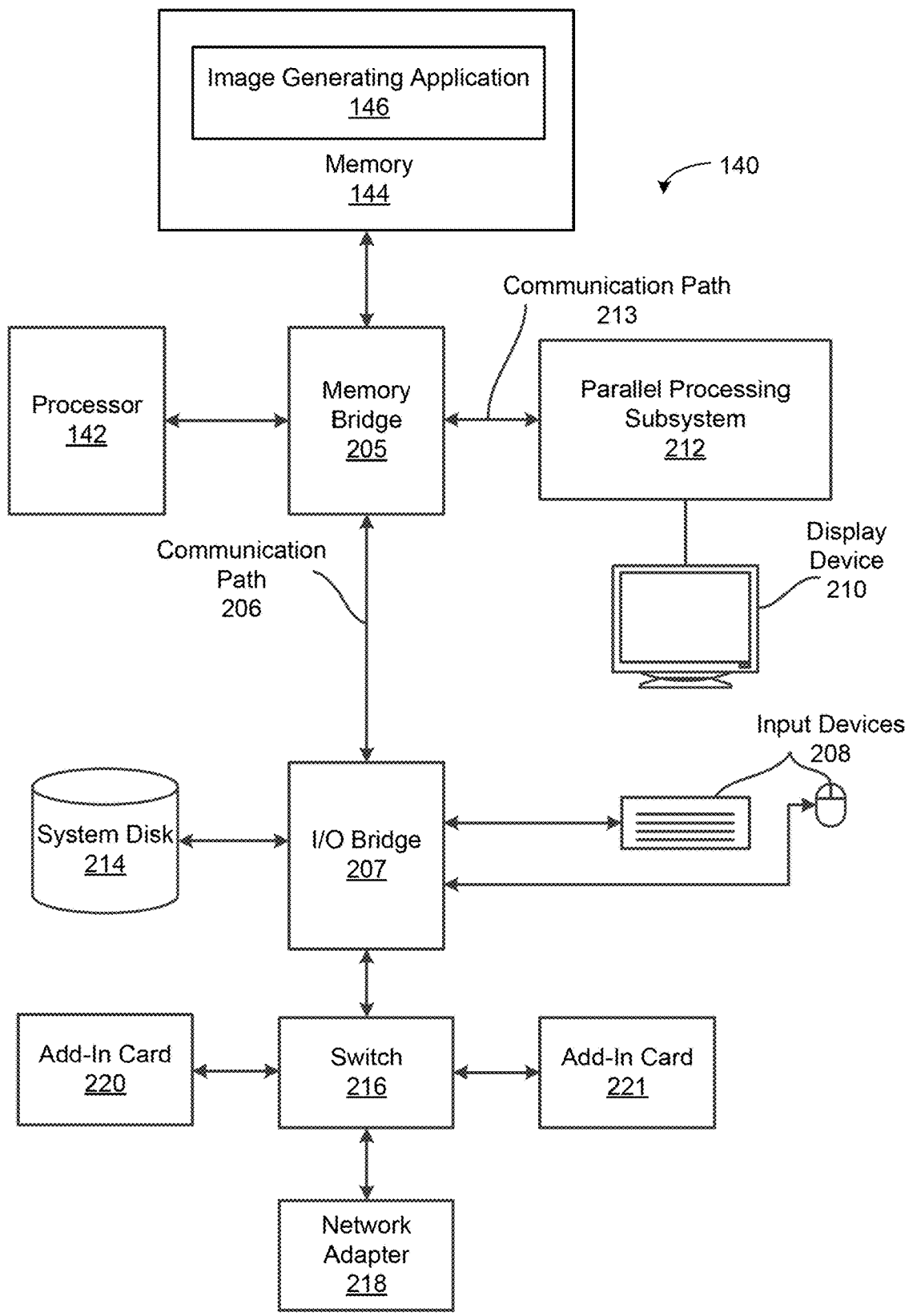
FIG. 2 is a more detailed illustration of the computing device of FIG. 1, according to various embodiments.

FIG. 2 is a more detailed illustration of the computing device 140 of FIG. 1, according to various embodiments. As persons skilled in the art will appreciate, computing device 140 can be any type of technically feasible computer system, including, without limitation, a server machine, a server platform, a desktop machine, a laptop machine, a hand-held/mobile device, or a wearable device. In some embodiments, computing device 140 is a server machine operating in a data center or a cloud computing environment that provides scalable computing resources as a service over a network. In some embodiments, the machine learning server 110 can include similar components as the computing device 140.

In various embodiments, the computing device 140 includes, without limitation, the processor 142 and the memory 144 coupled to a parallel processing subsystem 212 via a memory bridge 205 and a communication path 213. Memory bridge 205 is further coupled to an I/O (input/output) bridge 207 via a communication path 206, and I/O bridge 207 is, in turn, coupled to a switch 216.

In one embodiment, I/O bridge 207 is configured to receive user input information from optional input devices 208, such as a keyboard or a mouse, and forward the input information to processor 142 for processing via communication path 206 and memory bridge 205. In some embodiments, computing device 140 may be a server machine in a cloud computing environment. In such embodiments, computing device 140 may not have input devices 208. Instead, computing device 140 may receive equivalent input information by receiving commands in the form of messages transmitted over a network and received via the network adapter 218. In one embodiment, switch 216 is configured to provide connections between I/O bridge 207 and other components of the computing device 140, such as a network adapter 218 and various add-in cards 220 and 221.

In one embodiment, I/O bridge 207 is coupled to a system disk 214 that may be configured to store content and applications and data for use by processor 142 and parallel processing subsystem 212. In one embodiment, system disk 214 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 207 as well.

In various embodiments, memory bridge 205 may be a Northbridge chip, and I/O bridge 207 may be a Southbridge chip. In addition, communication paths 206 and 213, as well as other communication paths within computing device 140, may be implemented using any technically suitable protocols, including, without limitation, AGP (Accelerated Graphics Port), HyperTransport, or any other bus or point-to-point communication protocol known in the art.

In some embodiments, parallel processing subsystem 212 comprises a graphics subsystem that delivers pixels to an optional display device 210 that may be any conventional cathode ray tube, liquid crystal display, light-emitting diode display, or the like. In such embodiments, the parallel processing subsystem 212 incorporates circuitry optimized for graphics and video processing, including, for example, video output circuitry. As described in greater detail below in conjunction with FIGS. 2-3, such circuitry may be incorporated across one or more parallel processing units (PPUs), also referred to herein as parallel processors, included within parallel processing subsystem 212. In other embodiments, the parallel processing subsystem 212 incorporates circuitry optimized for general purpose and/or compute processing. Again, such circuitry may be incorporated across one or more PPUs included within parallel processing subsystem 212 that are configured to perform such general purpose and/or compute operations. In yet other embodiments, the one or more PPUs included within parallel processing subsystem 212 may be configured to perform graphics processing, general purpose processing, and compute processing operations. System memory 144 includes at least one device driver configured to manage the processing operations of the one or more PPUs within parallel processing subsystem 212. In addition, the system memory 144 includes the image generating application 146, described in greater detail in conjunction with FIGS. 1 and 3-4.

In various embodiments, parallel processing subsystem 212 may be integrated with one or more of the other elements of FIG. 1 to form a single system. For example, parallel processing subsystem 212 may be integrated with processor 142 and other connection circuitry on a single chip to form a system on chip (SoC).

In one embodiment, processor 142 is the master processor of computing device 140, controlling and coordinating operations of other system components. In one embodiment, processor 142 issues commands that control the operation of PPUs. In some embodiments, communication path 213 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of processors (e.g., processor 142), and the number of parallel processing subsystems 212, may be modified as desired. For example, in some embodiments, system memory 144 could be connected to processor 142 directly rather than through memory bridge 205, and other devices would communicate with system memory 144 via memory bridge 205 and processor 142. In other embodiments, parallel processing subsystem 212 may be connected to I/O bridge 207 or directly to processor 142, rather than to memory bridge 205. In still other embodiments, I/O bridge 207 and memory bridge 205 may be integrated into a single chip instead of existing as one or more discrete devices. In certain embodiments, one or more components shown in FIG. 1 may not be present. For example, switch 216 could be eliminated, and network adapter 218 and add-in cards 220, 221 would connect directly to I/O bridge 207. Lastly, in certain embodiments, one or more components shown in FIG. 1 may be implemented as virtualized resources in a virtual computing environment, such as a cloud computing environment. In particular, the parallel processing subsystem 212 may be implemented as a virtualized parallel processing subsystem in some embodiments. For example, the parallel processing subsystem 212 could be implemented as a virtual graphics processing unit (GPU) that renders graphics on a virtual machine (VM) executing on a server machine whose GPU and other physical resources are shared across multiple VMs.

Synthesizing Images using Denoising Diffusion Models

Figure 3:
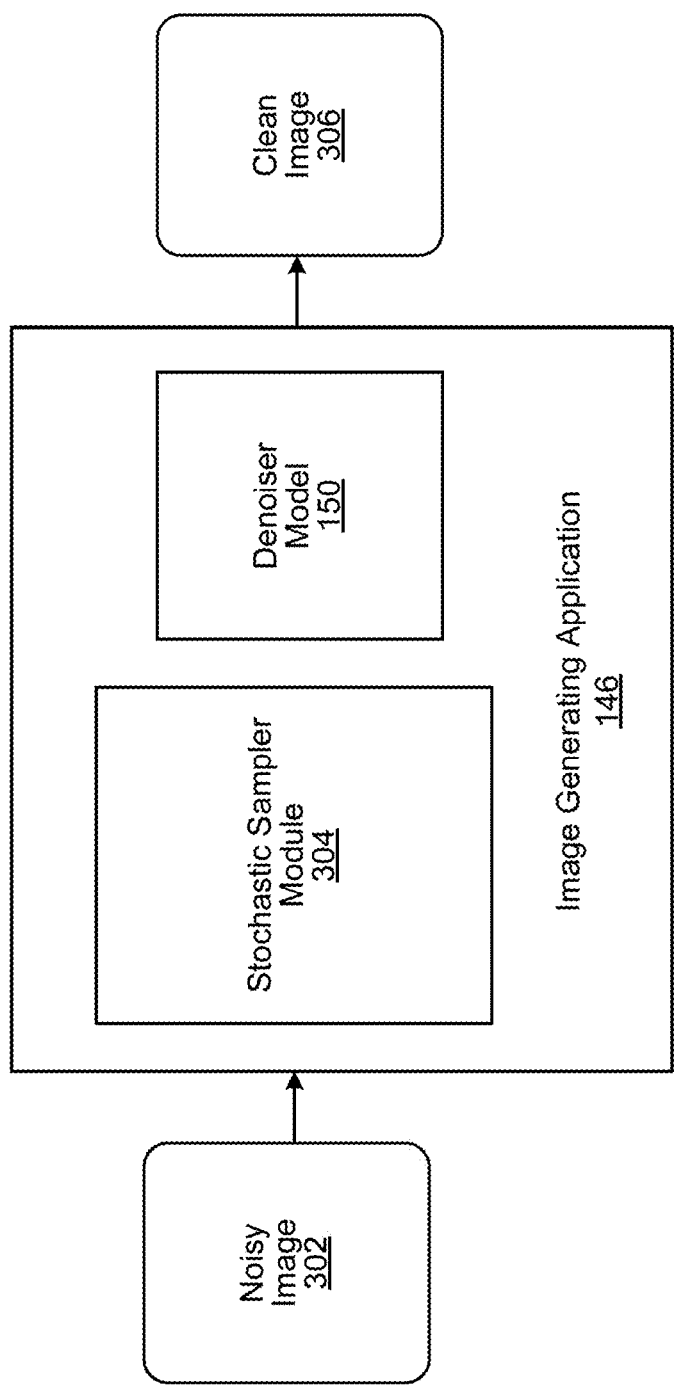
FIG. 3 is a more detailed illustration of the image generating application of FIG. 1, according to various embodiments.

FIG. 3 is a more detailed illustration of the image generating application 146 of FIG. 1, according to various embodiments. As shown, the image generating application 146 includes a stochastic sampler module ("stochastic sampler") 304 and the denoiser model 150. In operation, the image generating application 146 receives a noisy image 302 as input. For example, the noisy image 302 could be an image that includes pure noise. As another example, the noisy image 302 could be a noisy version of an existing image that is to be edited and/or modified. In some embodiments, the noisy image 302 includes additive Gaussian noise. The stochastic sampler 304 processes the noisy image 302 according to a denoising diffusion model to generate a clean image 306. The processing (1) begins with the noisy image 302 and metadata indicating a level of noise in the noisy image 302; and (2) includes, for each of a number of iterations, adding noise (e.g., uncorrelated Gaussian noise) to the image and then reducing noise in the resulting image to a level of noise that is less than a level of noise before the adding of noise, while updating the metadata to indicate the levels of noise in the image after the adding of noise and the reduction of noise, as discussed in greater detail below.

Figure 4:
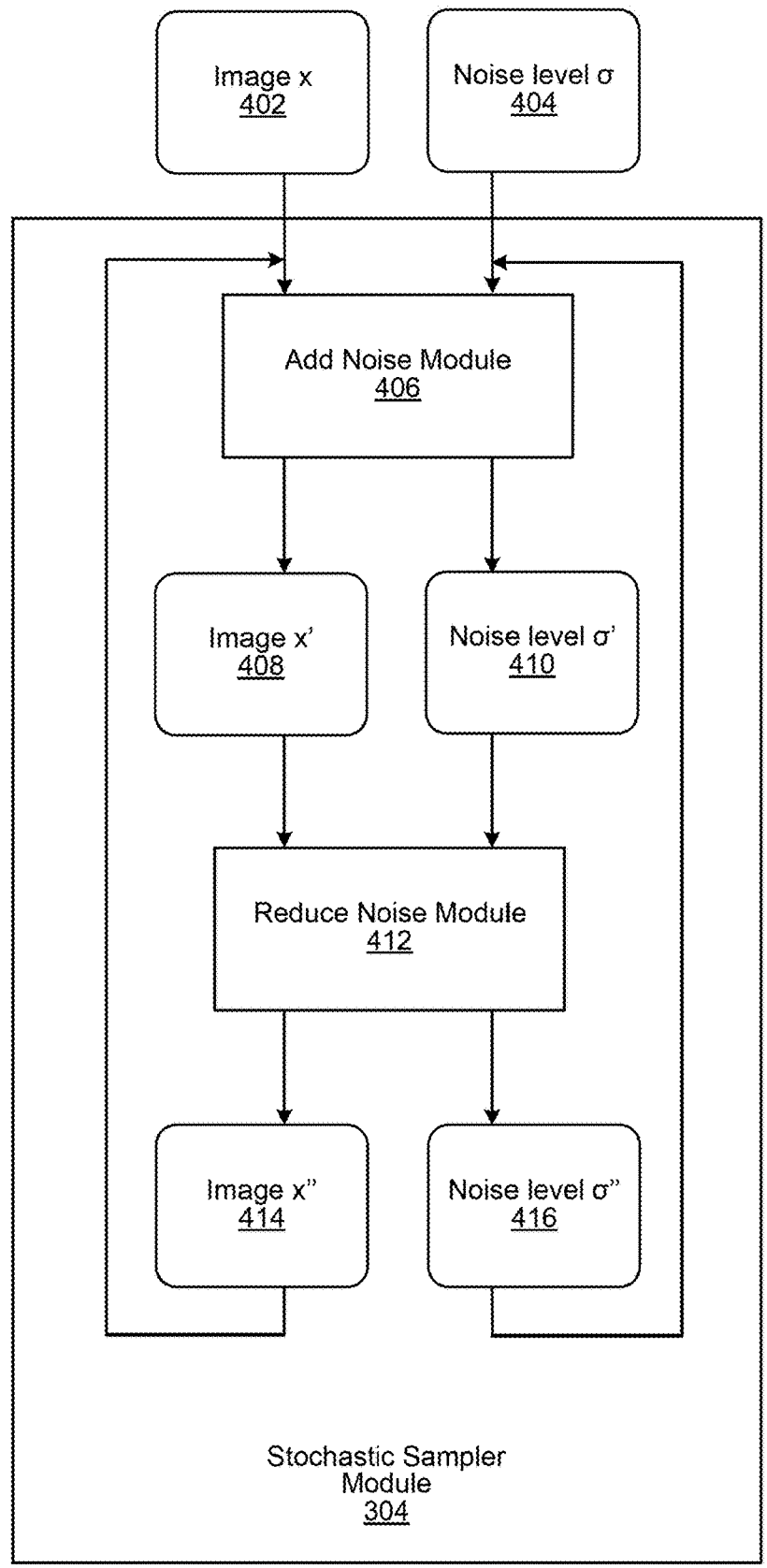
FIG. 4 is a more detailed illustration of the stochastic sampler of FIG. 3, according to various embodiments.

FIG. 4 is a more detailed illustration of the stochastic sampler 304 of FIG. 3, according to various embodiments. As shown, the stochastic sampler 304 includes an add noise module 406 and a reduce noise module 412. In operation, the stochastic sampler 304 receives as input a noisy image 402, denoted by x, and metadata indicating a noise level 404, denoted by a, associated with the image 402. In some embodiments, the metadata indicates a standard deviation of noise.

During each iteration of stochastic sampling, the add noise module 406 adds noise to the image 402 to generate an image 408, denoted by x', and the add noise module 406 also updates the metadata to indicate a noise level 410, denoted by a', associated with the image 408. Any suitable amount of noise can be added by the add noise module 406 in some embodiments, i.e., the step size can be any arbitrary size. It should be noted that the amount of noise added at each iteration will affect the strength of random exploration of the underlying distribution, discussed in greater detail below. In addition, the add noise module 406 can add noise in any technically feasible manner in some embodiments, such as by constructing another image that includes random Gaussian noise and adding some of the random Gaussian noise in the generated image on top of the image 402 to generate the image 408. The add noise module 406 then updates the metadata to indicate the level of noise in the image 408. It should be understood that, because the level of noise in the image 402 and the amount of noise that is added are known, the resulting level of noise in the image 408 can also be determined.

After adding noise to the image 402 to generate the image 408, the reduce noise module 412 reduces noise in the image 408 to generate an image 414, denoted by x", and the reduce noise module 412 also updates the metadata to indicate a noise level 416, denoted by σ", associated with the image 414. In particular, the reduce noise module 412 reduces the noise to a level that is less than the level of noise before noise was added by the add noise module 406 (e.g., the noise level 416, σ", is less than the noise level 404, σ). Any suitable amount of noise reduction that reduces the level of noise to below the level of noise before noise was added can be performed in some embodiments, i.e., the step size can be any arbitrary size so long as the level of noise is reduced to below the level of noise before noise was added. In some embodiments, the reduce noise module 412 can be implemented as an ordinary differential equation (ODE) solver, including as a higher-order ODE solver, as discussed in greater detail below. In some embodiments, the reduce noise module 412 reduces noise in the image 408 to generate the image 414 by (1) inputting the image 408 and the level of noise 410 in the image 408 into a trained denoiser model (e.g., denoiser model 150) that outputs a clean image, and (2) mixing the image 408 and the clean image to generate the image 414. For example, the image 414 can include a linear mixture of 90% of the image 408 and 10% of the clean image to reduce the noise by 10%. The reduce noise module 412 then updates the metadata accordingly to indicate a level of noise in the image 414. In some embodiments, the denoiser model can instead output an estimate of the noise in the input image, a mixture of the noise and a clean image, a latent representation, or a score vector.

The foregoing process is repeated for additional iterations if the image 414 still includes noise (i.e., the noise level is not 0), or still includes more than a threshold amount of noise, i.e., the image 414 is not considered a clean image. It should be noted that the sequential adding and removing of noise during each iteration of stochastic sampling by the stochastic sampler 304 is different from conventional approaches for stochastic sampling, which typically add and remove noise from an image in parallel to generate two images that are then combined into a single image via a linear mixture of the two images.

More formally, the stochastic differential equations (SDEs) used in some denoising diffusion models can be generalized as a sum of the probability flow of an ODE and a time-varying Langevin diffusion SDE:

$$dx_{\pm} = -\dot{\sigma}(t)\sigma(t)\nabla_x \log p(x;\sigma(t))dt \pm \beta(t)\sigma(t)^2 \nabla_x \log p(x;\sigma(t))dt + \sqrt{2\beta(t)}\sigma(t)d\omega_t. \quad (1)$$

$dx_+$ and $dx_-$ are separate SDEs for moving forward and backward in time, related by a time reversal formula. In equation (1), $-\dot{\sigma}(t)\sigma(t)\nabla_x \log p(x; \sigma(t))dt$ is a probability flow ODE term, $\beta(t)\sigma(t)^2 \nabla_x \log p(x; \sigma(t))dt$ is a deterministic noise decay term, and $\sqrt{2\beta(t)}\sigma(t)d\omega_t$ is a noise injection term, where $\omega_t$ is the standard Wiener process. Together, $\beta(t)\sigma(t)^2 \nabla_x \log p(x; \sigma(t))dt + \sqrt{2\beta(t)}\sigma(t)d\omega_t$ corresponds to a time-varying Langevin diffusion SDE, which can be seen as a combination of a deterministic score-based denoising term and a stochastic noise injection term, whose net noise level contributions cancel out. As such, $\beta(t)$ effectively expresses the relative rate at which existing noise is replaced with new noise. Stochasticity is helpful because the implicit Langevin diffusion drives the sample towards the desired marginal distribution at a given time, actively correcting for any errors made in earlier sampling steps. That is, the Langevin diffusion SDE term in equation (1) randomly explores the underlying distribution, which can correct errors in the earlier sampling steps.

In some embodiments, the stochastic sampling performed by the stochastic sampler 304 combines a second order deterministic ODE integrator with an explicit Langevin-like "churn" of adding and removing noise. By explicitly implementing the steps of adding and removing noise, the stochastic sampling performed by the stochastic sampler 304 benefits from Langevin exploration of the underlying distribution to correct errors in earlier sampling steps, while being simple like an ODE deterministic solver (as opposed to an SDE solver). Pseudocode for performing such stochastic sampling is shown in Algorithm 1.

higher noise level $\hat{t}_i \leftarrow t_i + \gamma_i t_i$. Second, from the increased-noise sample $\hat{x}_i$, the ODE is solved backward from $\hat{t}_i$ to $t_{i+1}$ with a single step using the trained denoiser model $D_\theta$. Doing so yields a sample $x_{i+1}$ with noise level $t_{i+1}$, and the iterating continues. The correctness of such a stochastic sampling procedure stems from the alternation of two sub-steps that each maintain the correct distribution (up to a truncation error in the ODE step).

Figure 5:
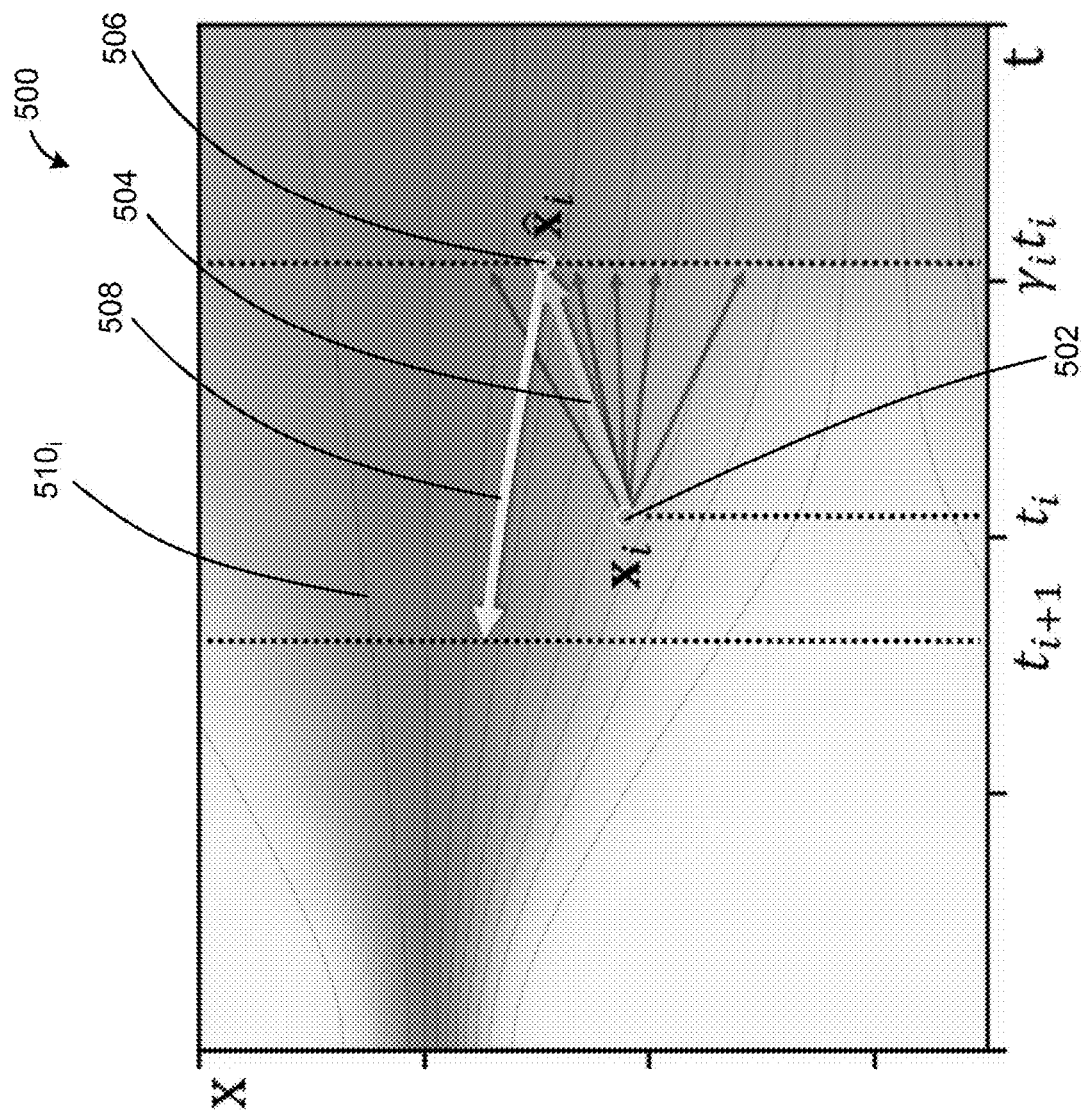
FIG. 5 illustrates an example of one iteration of stochastic sampling, according to various embodiments.

FIG. 5 illustrates an example of one iteration of stochastic sampling, according to various embodiments. As shown, an image 502 at time step i, denoted by $x_i$, has a certain amount of noise. During an iteration of stochastic sampling, the stochastic sampler 304 performs a step 504 of adding noise to the image 502 to generate a noisier image 506, denoted by $\hat{x}_i$. Then, the stochastic sampler 304 performs a step 508 of reducing noise in the image 506 to generate an image at time step i+1 that has less noise than the image 502 at time step i. The foregoing steps are repeated for multiple iterations of the stochastic sampling, until noise has been removed (e.g., the noise level is 0 in some embodiments, or less than a threshold in some other embodiments) from the image.

Figure 6:
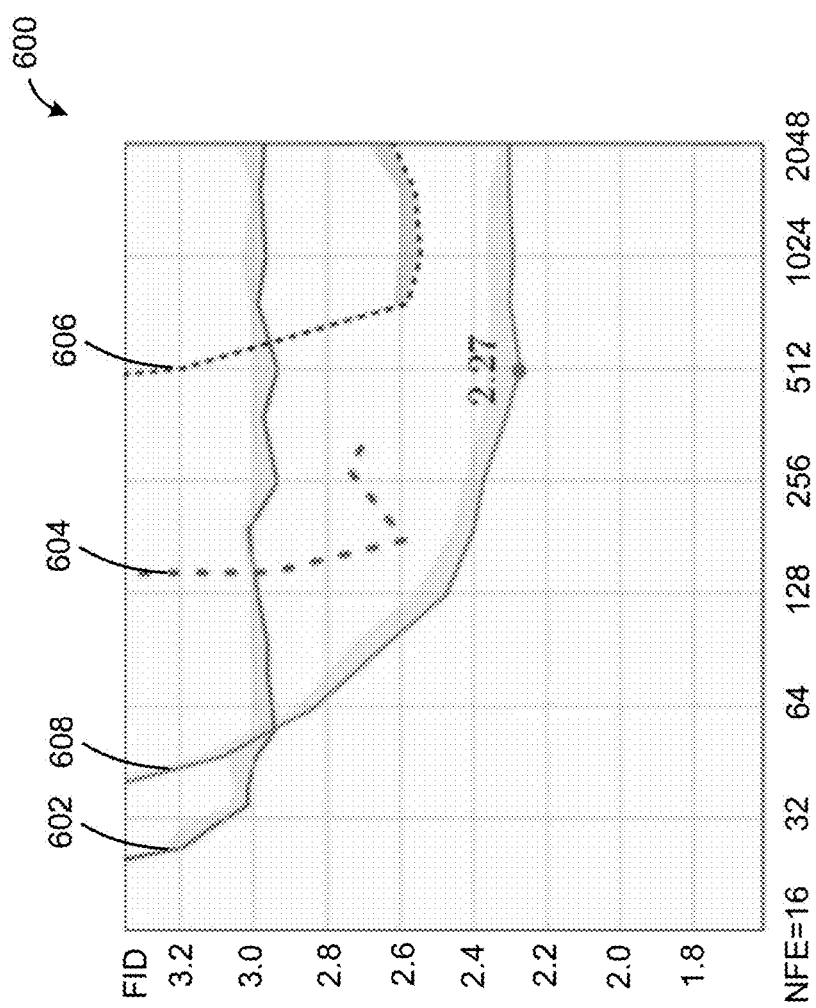
FIG. 6 illustrates exemplar performance of stochastic sampling by the stochastic sampler of FIG. 3 relative to conventional sampling techniques, according to various embodiments.

FIG. 6 illustrates exemplar performance of stochastic sampling by the stochastic sampler 304 of FIG. 3 relative to conventional sampling techniques, according to various embodiments. As shown, a graph 600 includes a horizontal (x) axis that represents the neural function evaluations (NFE), indicative of the total execution time, and a vertical (y) axis that represents Fréchet inception distance (FID). FID is a metric that indicates the quality and diversity of images being generated, with lower FID values being better. As shown, stochastic sampling by the stochastic sampler 304, represented by line 608, achieves a lower FID relative to the conventional deterministic $2^{nd}$ order ODE solver, a standard $2^{nd}$ order adaptive SDE solver, and the standard Euler-Maruyama SDE solver techniques, represented by lines 602, 604, and 606, respectively. In addition, the stochastic sampling by the stochastic sampler 304 is faster, i.e.,

---

Algorithm 1: Stochastic sampler with $\sigma(t) = t$ and $s(t) = 1$

1: Procedure StochasticSampler($D_\theta$ (x; $\sigma$), $t_{i \in \{0, \ldots, N\}}$, $\gamma_{i \in \{0, \ldots, N-1\}}$, $S_{noise}$)
2:    sample $x_0 \sim \mathcal{N}(0, t_0^2 I)$
3:    for $i \in \{0, \ldots, N-1\}$ do 4:       sample $\epsilon_i \sim \mathcal{N}(0, S_{noise}^2 I)$ // $\gamma_i = \begin{cases} \min(\frac{S_{churn}}{N}, \sqrt{2}-1) & \text{if } t_i \in [S_{tmin}, S_{tmax}] \\ 0 & \text{otherwise} \end{cases}$ 5:       $\hat{t}_i \leftarrow t_i + \gamma_i t_i$ // Select temporarily increased noise level $\hat{t}_i$ 6:       $\hat{x}_i \leftarrow x_i + \sqrt{\hat{t}_i^2 - t_i^2} \epsilon_i$ // Add new noise to move from $t$ to $\hat{t}_i$ 7:       $d_i \leftarrow (\hat{x}_i - D_\theta(\hat{x}_i; \hat{t}_i))/\hat{t}_i$ // Evaluate dx/dt at $\hat{t}_i$
8:       $x_{i+1} \leftarrow \hat{x}_i + (t_{i+1} - \hat{t}_i) d_i$ // Take Euler step from $\hat{t}_i$ to $t_{i+1}$
9:       if $t_{i+1} \neq 0$ then
10:          $d_i' \leftarrow (x_{i+1} - D_\theta(x_{i+1}; t_{i+1}))/t_{i+1}$ // Apply $2^{nd}$ order correction 11:       $x_{i+1} \leftarrow \hat{x}_i + (t_{i+1} - \hat{t}_i)\left(\frac{1}{2} d_i + \frac{1}{2} d_i'\right)$ 12:    return $x_N$

---

In Algorithm 1, at each step i, given the sample $x_i$ at noise level $t_i (=\sigma(t_i))$, two sub-steps are performed. First, noise is added to the sample according to a factor $\gamma_i \geq 0$ to reach a requires fewer executions of the denoiser model 150 to achieve a sufficiently low FID value, relative to the conventional techniques represented by the lines 602, 604, and 606.

Figure 7:
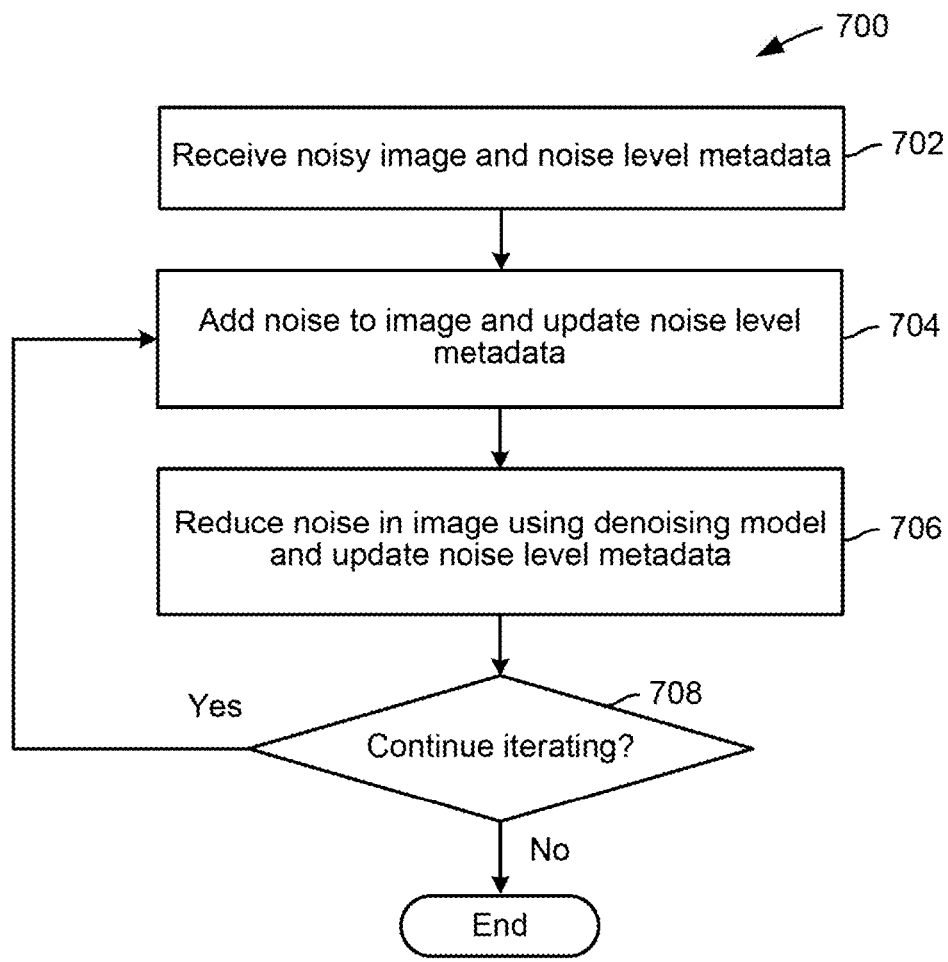
FIG. 7 is a flow diagram of method steps for generating an image using a denoising diffusion model, according to various embodiments.

FIG. 7 is a flow diagram of method steps for generating an image using a denoising diffusion model, according to various embodiments. Although the method steps are described in conjunction with the system of FIGS. 1-4, persons skilled in the art will understand that any system configured to perform the method steps in any order falls within the scope of the present embodiments.

As shown, a method 700 begins at step 702, where the image generating application 146 receives a noisy image and associated metadata indicating a noise level in the noisy image. In some embodiments, the noisy image can include substantially pure Gaussian white noise, and the noisy image can be generated in any technically feasible manner. In some embodiments, the noisy image can be a noisy version of an existing image that is to be edited and/or modified. In some embodiments, the image generating application 146 can generate the noisy image rather than receiving the noisy image.

At step 704, the image generating application 146 adds noise to the image and updates the noise level metadata. In some embodiments, the image generating application 146 adds Gaussian noise to the image to generate a noisier image, and the amount of Gaussian noise that is added depends on the level of noise indicated by the noise level metadata received at step 702. In addition, after adding the noise, the image generating application 146 updates the noise level metadata to indicate a level of noise in the noisier image.

At step 706, the image generating application 146 reduces the noise in the image using a denoiser model (e.g., denoiser model 150) and again updates the noise level metadata. In some embodiments, the image generating application 146 generates an image that includes less noise by (1) inputting the image and the level of noise indicated by the metadata that was updated at step 704 into the denoiser model, which outputs a clean image; and (2) mixing the image and the clean image. In some embodiments, the image generating application 146 further inputs, into the denoiser model, an indication that the image is not augmented, as discussed in greater detail below in conjunction with FIGS. 8-10.

At step 708, if the image generating application 146 determines to continue iterating, then the method 700 returns to step 704, where the image generating application 146 again adds noise to the image and updates the noise level metadata. In some embodiments, the image generating application 146 continues iterating if the level of noise in the image after the reduction of noise at step 706 is not 0, or alternatively not less than a threshold level of noise. On the other hand, if the image generating application 146 determines to stop iterating, then the method 700 ends.

Augmentation Regularization During Machine Learning Model Training

Figure 8:
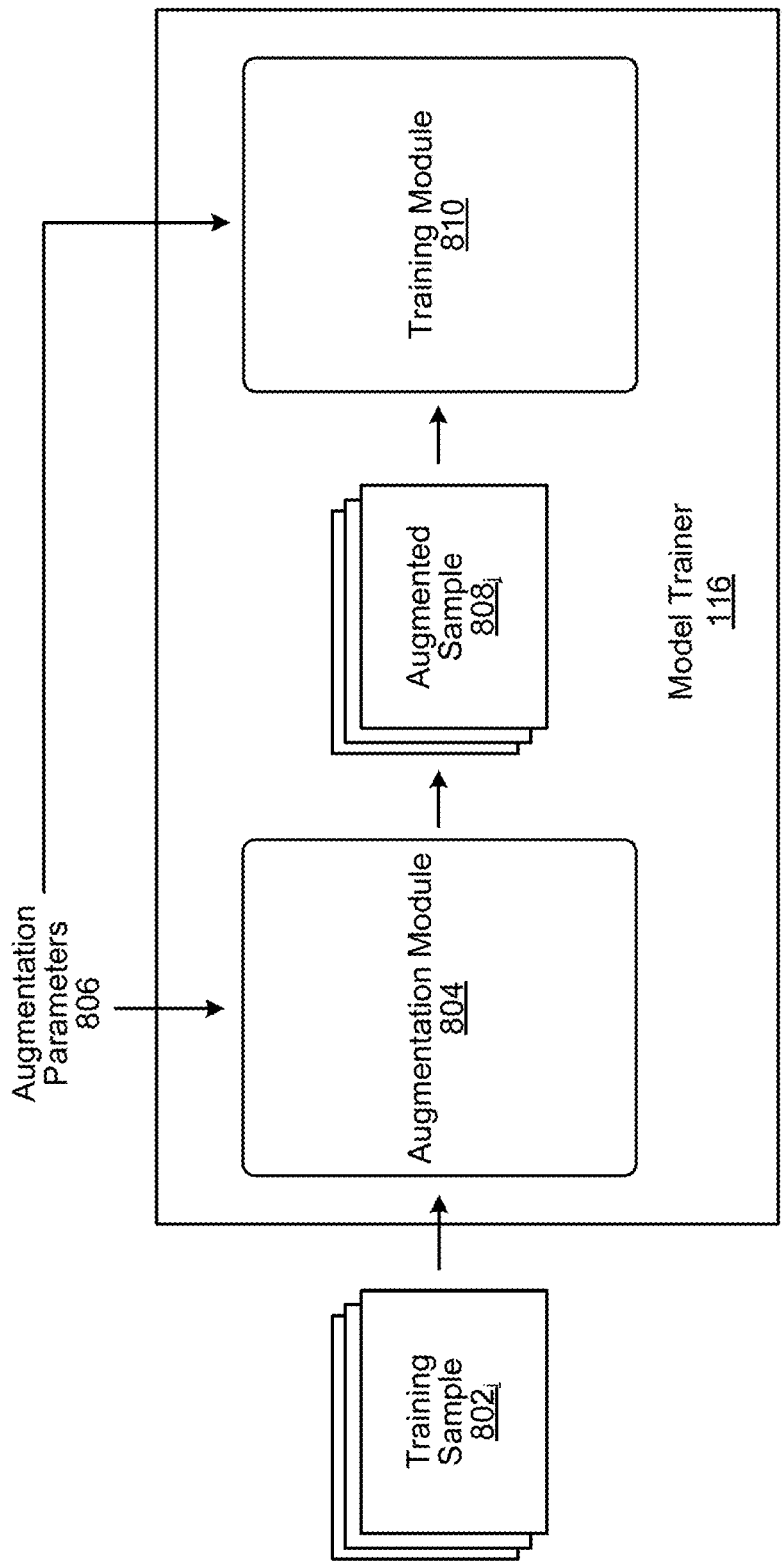
FIG. 8 is a more detailed illustration of the model trainer of FIG. 1, according to various embodiments.

FIG. 8 is a more detailed illustration of the model trainer 116 of FIG. 1, according to various embodiments. As shown, the model trainer 116 includes an augmentation module 804 and a training module 810. In operation, the model trainer 116 receives as input training samples $802_i$ (referred to herein collectively as "training samples 802" and individually as a "training sample 802") that can be used to train a denoiser model (e.g., denoiser model 150). In some embodiments, each training sample 802 includes a noise level and a noisy image that are to be input into a denoiser model, and a corresponding clean image that is an expected output of the denoiser model. In some embodiments, the noise level can be chosen randomly and the noisy image can be constructed on-the-fly based on the noise level and the clean image. In some embodiments, the training samples can include application-specific conditioning information. Although discussed herein primarily with respect to training a denoiser model as a reference example, in some embodiments, any suitable machine learning model can be trained according to the techniques disclosed herein. In particular, other classes of generative models, such as generative adversarial networks (GANs), can be trained according to techniques disclosed herein in some embodiments.

In order to train the denoiser model to be able to generalize and to prevent overfitting during the training, the augmentation module 804 of the model trainer 116 applies various augmentations to the training samples 802 to generate additional training samples that are included, along with the original training samples 802, in augmented samples $808_i$ (referred to herein collectively as "augmented samples 808" and individually as an "augmented sample 808"). In some embodiments, any technically feasible augmentations can be applied to the training samples 802 to generate augmented samples. For example, in some embodiments, the augmentations can include geometric transformations, color changes, filtering, masking, cropping, compression, quantization, pixelation, decimation, composition, cutout, cutmix, mixup, and/or a combination thereof. Examples of geometric transformations include isotropic scaling, rotation, anisotropic scaling, integer translation, fractional translation, flip along an axis, etc. of the training samples 802. In some embodiments, applying the augmentations to the training samples 802 to generate additional training samples includes (1) applying the augmentations to clean images included in the training samples 802 to generate augmented clean images, and (2) adding noise to the augmented clean images to generate augmented noisy images, i.e., augmentations are be applied to training images prior to adding noise. Each pair of augmented clean images and corresponding augmented noisy images can then be included as an augmented sample in the augmented samples 808.

Illustratively, the model trainer 116 also receives augmentation parameters 806 that indicate the augmentations that the augmentation module 804 needs to apply to the training samples 802. In some embodiments, the model trainer 116 can determine the augmentation parameters to apply rather than receiving the augmentation parameters 806. The same augmentation parameters 806 that the augmentation module 804 applies to the training samples 802 to generate the augmented samples 808 are also used by the training module 810 to train a denoiser model. As described, in some embodiments, the denoiser model can be trained to, given a noisy image and a level of noise in the noisy image, generate a clean image that is a noise-free version of the noisy image. During such training, the training module 810 also inputs the augmentation parameters 806 into the denoiser model as conditioning information. In some embodiments, the augmentation parameters 806 are input into the denoiser model along with corresponding noisy images included in the augmented training samples 808 that are associated with the augmentation parameters 806 and levels of noise in the corresponding noisy image, and the expected outputs are denoised images included in the augmented samples 808 that are associated with the same augmentation parameters 806. For example, in some embodiments, the augmentation parameters associated with a particular noisy image in the augmented samples 808 can be input as a vector into the denoiser model along with the particular noisy image and the level of noise in the particular noisy image, and the expected output is a noise-free version of the noisy image. It should be noted that the training essentially trains the denoiser model to perform different tasks associated with different augmentations (e.g., denoising geometrically transformed images, denoising images with color changes, denoising images that are not augmented, etc.) that are indicated by the augmentation parameters input into the denoiser model as conditioning information.

Once trained, the denoiser model can be deployed (e.g., in image generating application 146) for use in denoising images, while being conditioned with augmentation parameters indicating no augmentation. For example, in some embodiments, a vector of zeroes, indicating no augmentation, can be input into the denoiser model along with a noisy image.

Accordingly, the denoiser model benefits from being trained using a larger set of training samples, namely the augmented samples 808, but the trained denoiser model can be configured to generate images that do not include augmentations similar to the augmentations included in the augmented samples 808, i.e., the augmentations are prevented from leaking to images generated by the trained denoiser model.

Figure 9A:
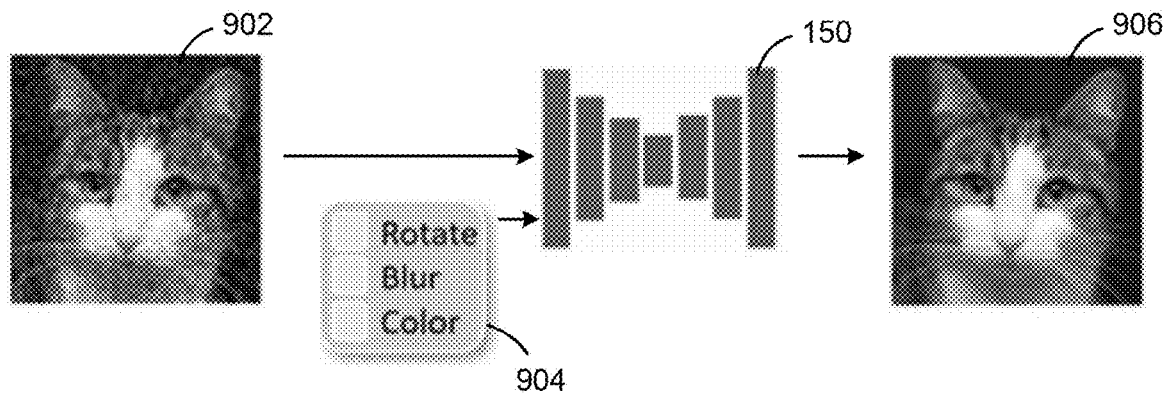
FIGS. 9A-9C illustrate how to train a denoiser model conditioned on exemplar augmentation parameters, according to various embodiments.
Figure 9B:
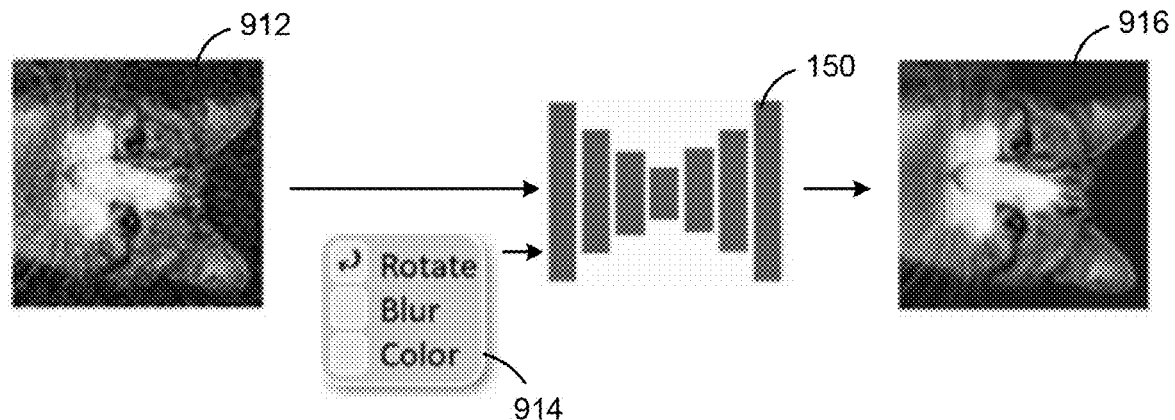
Figure 9C:
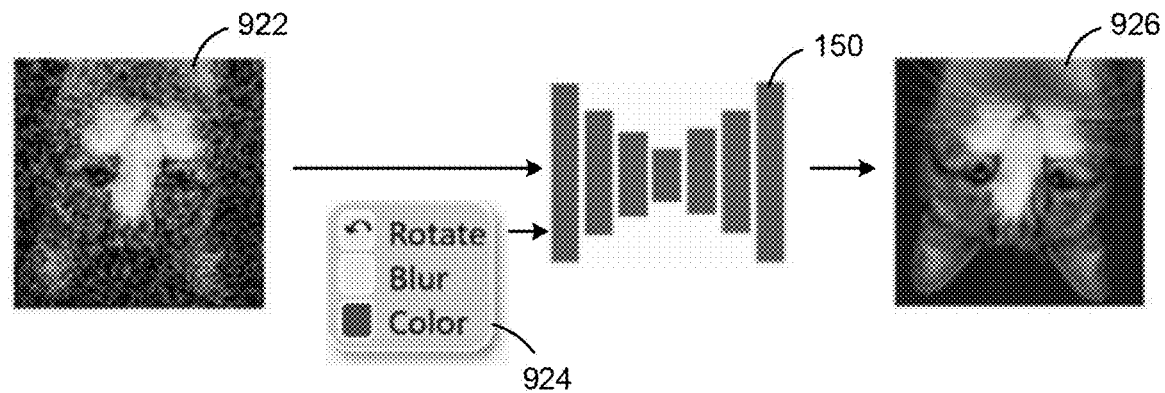

FIGS. 9A-9C illustrate how to train a denoiser model conditioned on exemplar augmentation parameters, according to various embodiments. As shown in FIG. 9A, a noisy image 902 and a corresponding expected output clean image 906 are used to train the denoiser model 150, which is conditioned using information 904 indicating no augmentations when being trained using the noisy image 902 and the clean image 906. In some embodiments, any technically feasible training techniques, such as backpropagation with gradient descent, can be applied to train the denoiser model 150.

As shown in FIG. 9B, a noisy image 912 and a corresponding expected output clean image 916 are also used to train the denoiser model 150. The denoiser model 150 is conditioned using information 914 that indicates a clockwise rotation of 90 degrees when being trained using the noisy image 912 and the clean image 916.

As shown in FIG. 9C, a noisy image 922 and a corresponding expected output clean image 926 are also used to train the denoiser model 150. The denoiser model 150 is conditioned using information 924 that indicates a counter-clockwise rotation of 180 degrees and color alteration when being trained using the noisy image 922 and the clean image 926.

Figure 10:
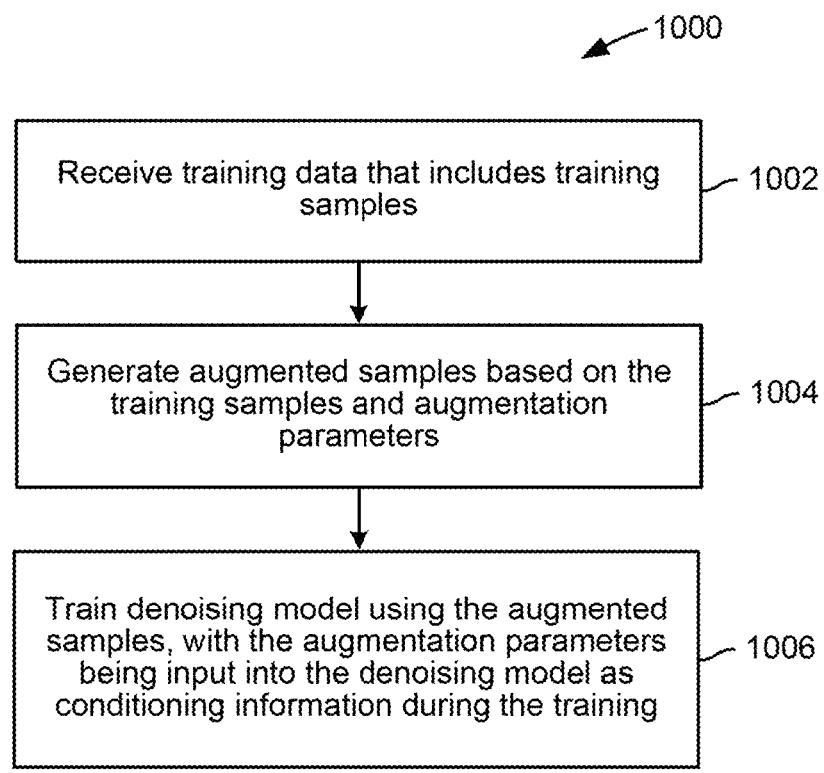
FIG. 10 is a flow diagram of method steps for training a denoiser model, according to various embodiments.

FIG. 10 is a flow diagram of method steps for training a denoiser model, according to various embodiments. Although the method steps are described in conjunction with the system of FIGS. 1-2 and 8, persons skilled in the art will understand that any system configured to perform the method steps in any order falls within the scope of the present embodiments.

As shown, a method 1000 begins at step 1002, where the model trainer 116 receives training data that includes a number of training samples. As described, in some embodiments, each training sample includes a noisy image, and a noise level associated with the noisy image, that are to be input into a denoiser model, as well as a corresponding clean image that is an expected output of the denoiser model.

At step 1004, the model trainer 116 generates augmented samples based on the training samples and augmentation parameters. The augmentation parameters can indicate any technically feasible augmentations in some embodiments, such as geometric transformations (e.g., isotropic scaling, rotation, anisotropic scaling, integer translation, fractional translation, flip along an axis, etc.), color changes, filtering, masking, cropping, compression, quantization, pixelation, decimation, composition, cutout, cutmix, mixup, and/or a combination thereof. The model trainer 116 applies the augmentations indicated by the augmentation parameters to the training samples to generate the augmented samples. In some embodiments, the model trainer 116 applies the augmentations indicated by the augmentation parameters to each clean image included in the training samples to generate an augmented clean image, and then adds noise to the augmented clean image to generate an augmented noisy image. In such cases, the augmented noisy image and a noise level associated with the augmented noisy image, as well as the augmented clean image, can be included in an augmented sample as examples of inputs into a denoiser model and an expected output of the denoiser model, respectively.

At step 1006, the model trainer 116 trains a denoiser model using the augmented samples, with the augmentation parameters being input into the denoiser model as conditioning information during the training. In some embodiments, the model training 116 also trains the denoiser model using the training samples received at step 1002 and conditioning information indicating no augmentation. Once trained, the denoiser model can be deployed for use in denoising noisy images. In some embodiments, the noisy images are input into the trained denoiser model along with conditioning information indicating no augmentation. Given such inputs, the trained denoiser model will output a clean image that does not include augmentations.

In sum, techniques are disclosed for generating content items using denoising diffusion models. In some embodiments, an image generating application receives as input an image that includes noise and metadata indicating a level of noise in the image. The image generating application generates an image that does not include noise by, for each of a number of time steps: (1) adding noise to a first version of the noisy image to generate a second version of the noisy image; and then (2) reducing noise in the second version of the noisy image to a level of noise below a level of noise associated with the first version of the image. In some embodiments, a trained denoiser machine learning model ("denoiser model") is applied to reduce the noise in the second version of the image. Further, the image generating application updates the metadata to indicate the levels of noise in the second version of the noisy image after the addition of noise and in the third version of the noisy image after the reduction of noise.

In addition, in some embodiments, augmented training data samples are generated based on augmentation parameters. In such cases, the denoiser model is trained using the augmented training data samples, and the augmentation parameters are input into the denoiser model as conditioning information during the training.

Although discussed herein primarily with respect to noise (e.g., uncorrelated Gaussian noise) as a reference example, in some embodiments, images can include any technically feasible corruption, such as noise, blur, filtering, masking, pixelation, dimensionality reduction, compression, quantization, spatial decimation, and/or temporal decimation. In such cases, techniques disclosed herein can be applied to reduce and/or eliminate the corruption in the images to generate clean images that do not include corruption or include less than a threshold level of corruption.

Although discussed herein primarily with respect to images as a reference example, in some embodiments, techniques disclosed herein can be applied to generate content items that include any technically feasible data that can be corrupted to various degrees, such as bitmap images, video clips, audio clips, three-dimensional (3D) models, time series data, latent representations, etc. In such cases, techniques disclosed herein can be applied to reduce and/or eliminate corruption in the content items to generate clean content items that do not include corruption or include less than a threshold level of corruption.

At least one technical advantage of the disclosed techniques relative to the prior art is that the disclosed techniques can generate content items more quickly than what can be achieved using conventional denoising diffusion techniques. Further, relative to the content items that can be generated using conventional denoising diffusion techniques, content items generated using the disclosed techniques generally have better quality and are more diverse in terms of what is included in the content items. In addition, the disclosed techniques permit training data to be augmented in order to more effectively and accurately train machine learning models, such as machine learning models that remove corruption from content items, without negatively impacting outputs of the trained machine learning models. These technical advantages represent one or more technological improvements over prior art approaches.

1. In some embodiments, a computer-implemented method for generating a content item comprises receiving a content item and metadata indicating a level of corruption associated with the content item, and for each iteration included in a plurality of iterations performing one or more operations to add corruption to a first version of the content item to generate a second version of the content item, and performing one or more operations to reduce corruption in the second version of the content item to generate a third version of the content item, wherein a level of corruption associated with the third version of the content item is less than a level of corruption associated with the first version of the content item.

2. The computer-implemented method of clause 1, further comprising updating the metadata to indicate a level of corruption associated with the second version of the content item and the level of corruption associated with the third version of the content item.

3. The computer-implemented method of clauses 1 or 2, wherein performing the one or more operations to reduce corruption in the second version of the content item comprises performing one or more operations on the second version of the content item using a trained machine learning model.

4. The computer-implemented method of any of clauses 1-3, wherein the corruption in the second version of the content item is reduced using a trained machine learning model, and the method further comprises performing one or more operations to train the machine learning model, the one or more operations to train the machine learning model comprising receiving training data that includes one or more samples, generating one or more augmented samples based on the one or more samples and one or more augmentation parameters, and training the machine learning model based on the one or more augmented samples, wherein the one or more augmentation parameters are input into the machine learning model as conditioning information during the training.

5. The computer-implemented method of any of clauses 1-4, wherein each augmentation parameter included in the one or more augmentation parameters is associated with at least one of a geometric transformation, a color change, a filtering, a masking, a cropping, a compression, a quantization, a pixelation, a decimation, a composition, a cutout, a cutmix, or a mixup.

6. The computer-implemented method of any of clauses 1-5, wherein performing the one or more operations to reduce corruption in the second version of the content item comprises performing one or more deterministic ordinary differential equation integration operations on the second version of the content item.

7. The computer-implemented method of any of clauses 1-6, wherein performing the one or more operations to add corruption to the first version of the content item comprises performing one or more operations to add at least one of noise, blur, filtering, masking, pixelation, dimensionality reduction, compression, quantization, spatial decimation, or temporal decimation to the first version of the content item.

8. The computer-implemented method of any of clauses 1-7, further comprising terminating the plurality of iterations in response to determining that the level of corruption associated with the third version of the content item is either zero or less than a predefined threshold.

9. The computer-implemented method of any of clauses 1-8, wherein an amount of corruption added to the first version of the content item is based on the level of corruption associated with the first version of the content item.

10. The computer-implemented method of any of clauses 1-9, wherein an amount of corruption reduced in the second version of the content item is based on a level of corruption associated with the second version of the content item.

11. In some embodiments, one or more non-transitory computer-readable media store program instructions that, when executed by at least one processor, cause the at least one processor to perform the steps of receiving a content item and metadata indicating a level of corruption associated with the content item, and for each iteration included in a plurality of iterations performing one or more operations to add corruption to a first version of the content item to generate a second version of the content item, and performing one or more operations to reduce corruption in the second version of the content item to generate a third version of the content item, wherein a level of corruption associated with the third version of the content item is less than a level of corruption associated with the first version of the content item.

12. The one or more non-transitory computer-readable media of clause 11, wherein the instructions, when executed by the at least one processor, further cause the at least one processor to perform the step of updating the metadata to indicate a level of corruption associated with the second version of the content item and the level of corruption associated with the third version of the content item.

13. The one or more non-transitory computer-readable media of clauses 11 or 12, wherein performing the one or more operations to reduce corruption in the second version of the content item comprises performing one or more operations on the second version of the content item using a trained machine learning model.

14. The one or more non-transitory computer-readable media of any of clauses 11-13, wherein the corruption in the second version of the content item is reduced using a trained machine learning model, and the instructions, when executed by the at least one processor, further cause the at least one processor to perform one or more operations to train the machine learning model, the one or more operations to train the machine learning model comprising receiving training data that includes one or more samples, generating one or more augmented samples based on the one or more samples and one or more augmentation parameters, and training the machine learning model based on the one or more augmented samples, wherein the one or more augmentation parameters are input into the machine learning model as conditioning information during the training.

15. The one or more non-transitory computer-readable media of any of clauses 11-14, wherein performing the one or more operations to reduce corruption in the second version of the content item comprises applying an artificial neural network that includes either a U-Net architecture, a transformer architecture, a vision transformer architecture, a recurrent interface network architecture, or a convolutional architecture to the second version of the content item.

16. The one or more non-transitory computer-readable media of any of clauses 11-15, wherein performing the one or more operations to reduce corruption in the second version of the content item comprises performing one or more deterministic ordinary differential equation integration operations on the second version of the content item.

17. The one or more non-transitory computer-readable media of any of clauses 11-16, wherein performing the one or more operations to add corruption to the first version of the content item comprises performing one or more operations to add at least one of noise, blur, filtering, masking, pixelation, dimensionality reduction, compression, quantization, spatial decimation, or temporal decimation to the first version of the content item.

18. The one or more non-transitory computer-readable media of any of clauses 11-17, wherein an amount of corruption added to the first version of the content item is based on the level of corruption associated with the first version of the content item, and an amount of corruption reduced in the second version of the content item is based on a level of corruption associated with the second version of the content item.

19. In some embodiments, a system comprises one or more memories storing instructions, and one or more processors that are coupled to the one or more memories and, when executing the instructions, are configured to receive a content item and metadata indicating a level of corruption associated with the content item, and for each iteration included in a plurality of iterations perform one or more operations to add corruption to a first version of the content item to generate a second version of the content item, and perform one or more operations to reduce corruption in the second version of the content item to generate a third version of the content item, wherein a level of corruption associated with the third version of the content item is less than a level of corruption associated with the first version of the content item.

20. The system of clause 19, wherein the one or more processors, when executing the instructions, are further configured to update the metadata to indicate a level of corruption associated with the second version of the content item and the level of corruption associated with the third version of the content item.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a content item, the method comprising:
   receiving a content item and metadata indicating a level of corruption associated with the content item; and
   for each iteration included in a plurality of iterations:
      performing one or more operations to add corruption to a first version of the content item to generate a second version of the content item, and
      performing one or more operations to reduce corruption in the second version of the content item to generate a third version of the content item, wherein a level of corruption associated with the third version of the content item is less than a level of corruption associated with the first version of the content item.

2. The computer-implemented method of claim 1, further comprising updating the metadata to indicate a level of corruption associated with the second version of the content item and the level of corruption associated with the third version of the content item.

3. The computer-implemented method of claim 1, wherein performing the one or more operations to reduce corruption in the second version of the content item comprises performing one or more operations on the second version of the content item using a trained machine learning model.

4. The computer-implemented method of claim 1, wherein the corruption in the second version of the content item is reduced using a trained machine learning model, and the method further comprises performing one or more operations to train the machine learning model, the one or more operations to train the machine learning model comprising:
   receiving training data that includes one or more samples;
   generating one or more augmented samples based on the one or more samples and one or more augmentation parameters; and
   training the machine learning model based on the one or more augmented samples, wherein the one or more augmentation parameters are input into the machine learning model as conditioning information during the training.

5. The computer-implemented method of claim 4, wherein each augmentation parameter included in the one or more augmentation parameters is associated with at least one of a geometric transformation, a color change, a filtering, a masking, a cropping, a compression, a quantization, a pixelation, a decimation, a composition, a cutout, a cutmix, or a mixup.

6. The computer-implemented method of claim 1, wherein performing the one or more operations to reduce corruption in the second version of the content item comprises performing one or more deterministic ordinary differential equation integration operations on the second version of the content item.

7. The computer-implemented method of claim 1, wherein performing the one or more operations to add corruption to the first version of the content item comprises performing one or more operations to add at least one of noise, blur, filtering, masking, pixelation, dimensionality reduction, compression, quantization, spatial decimation, or temporal decimation to the first version of the content item.

8. The computer-implemented method of claim 1, further comprising terminating the plurality of iterations in response to determining that the level of corruption associated with the third version of the content item is either zero or less than a predefined threshold.

9. The computer-implemented method of claim 1, wherein an amount of corruption added to the first version of the content item is based on the level of corruption associated with the first version of the content item.

10. The computer-implemented method of claim 1, wherein an amount of corruption reduced in the second version of the content item is based on a level of corruption associated with the second version of the content item.

11. One or more non-transitory computer-readable media storing program instructions that, when executed by at least one processor, cause the at least one processor to perform the steps of:
   receiving a content item and metadata indicating a level of corruption associated with the content item; and
   for each iteration included in a plurality of iterations:
      performing one or more operations to add corruption to a first version of the content item to generate a second version of the content item, and
      performing one or more operations to reduce corruption in the second version of the content item to generate a third version of the content item, wherein a level of corruption associated with the third version of the content item is less than a level of corruption associated with the first version of the content item.

12. The one or more non-transitory computer-readable media of claim 11, wherein the instructions, when executed by the at least one processor, further cause the at least one processor to perform the step of updating the metadata to indicate a level of corruption associated with the second version of the content item and the level of corruption associated with the third version of the content item.

13. The one or more non-transitory computer-readable media of claim 11, wherein performing the one or more operations to reduce corruption in the second version of the content item comprises performing one or more operations on the second version of the content item using a trained machine learning model.

14. The one or more non-transitory computer-readable media of claim 11, wherein the corruption in the second version of the content item is reduced using a trained machine learning model, and the instructions, when executed by the at least one processor, further cause the at least one processor to perform one or more operations to train the machine learning model, the one or more operations to train the machine learning model comprising:

receiving training data that includes one or more samples;

generating one or more augmented samples based on the one or more samples and one or more augmentation parameters; and training the machine learning model based on the one or more augmented samples, wherein the one or more augmentation parameters are input into the machine learning model as conditioning information during the training.

15. The one or more non-transitory computer-readable media of claim 11, wherein performing the one or more operations to reduce corruption in the second version of the content item comprises applying an artificial neural network that includes either a U-Net architecture, a transformer architecture, a vision transformer architecture, a recurrent interface network architecture, or a convolutional architecture to the second version of the content item.

16. The one or more non-transitory computer-readable media of claim 11, wherein performing the one or more operations to reduce corruption in the second version of the content item comprises performing one or more deterministic ordinary differential equation integration operations on the second version of the content item.

17. The one or more non-transitory computer-readable media of claim 11, wherein performing the one or more operations to add corruption to the first version of the content item comprises performing one or more operations to add at least one of noise, blur, filtering, masking, pixelation, dimensionality reduction, compression, quantization, spatial decimation, or temporal decimation to the first version of the content item.

18. The one or more non-transitory computer-readable media of claim 11, wherein an amount of corruption added to the first version of the content item is based on the level of corruption associated with the first version of the content item, and an amount of corruption reduced in the second version of the content item is based on a level of corruption associated with the second version of the content item.

19. A system, comprising:
one or more memories storing instructions; and
one or more processors that are coupled to the one or more memories and, when executing the instructions, are configured to:
receive a content item and metadata indicating a level of corruption associated with the content item; and
for each iteration included in a plurality of iterations:
perform one or more operations to add corruption to a first version of the content item to generate a second version of the content item, and
perform one or more operations to reduce corruption in the second version of the content item to generate a third version of the content item, wherein a level of corruption associated with the third version of the content item is less than a level of corruption associated with the first version of the content item.

20. The system of claim 19, wherein the one or more processors, when executing the instructions, are further configured to update the metadata to indicate a level of corruption associated with the second version of the content item and the level of corruption associated with the third version of the content item.

* * * * *